US012138921B2

(12) United States Patent
Kobayashi

(10) Patent No.: US 12,138,921 B2
(45) Date of Patent: Nov. 12, 2024

(54) INKJET HEAD DRIVING METHOD AND INKJET RECORDING APPARATUS

(71) Applicant: KONICA MINOLTA, INC., Tokyo (JP)

(72) Inventor: Ryohei Kobayashi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 66 days.

(21) Appl. No.: 17/788,937

(22) PCT Filed: Dec. 25, 2019

(86) PCT No.: PCT/JP2019/050837

§ 371 (c)(1),
(2) Date: Jun. 24, 2022

(87) PCT Pub. No.: WO2021/130899

PCT Pub. Date: Jul. 1, 2021

(65) Prior Publication Data

US 2023/0044536 A1 Feb. 9, 2023

(51) Int. Cl.
*B41J 2/045* (2006.01)

(52) U.S. Cl.
CPC ......... *B41J 2/0459* (2013.01); *B41J 2/04581* (2013.01); *B41J 2/04588* (2013.01)

(58) Field of Classification Search
CPC ................ B41J 2/04581; B41J 2/04588; B41J 2/04541; B41J 2/04596; B41J 2/04595; B41J 2/04591; B41J 2202/20; B41J 2/14233; B41J 2002/14491; B41J 2/2146; B41J 2/2132; B41J 2/0459; B41J 2202/18; B41J 2/155; B41J 2202/21
See application file for complete search history.

(56) References Cited

FOREIGN PATENT DOCUMENTS

| | | | |
|---|---|---|---|
| JP | 2002079668 A | * | 3/2002 |
| JP | 2002264312 A | | 9/2002 |

(Continued)

OTHER PUBLICATIONS

EPO Extended Euopean Search Report for corresponding EP Application No. 19957131.6; Issued on Nov. 9, 2022.

(Continued)

*Primary Examiner* — Jannelle M Lebron
(74) *Attorney, Agent, or Firm* — CANTOR COLBURN LLP

(57) ABSTRACT

An inkjet head driving method includes applying a voltage signal having a combined drive waveform that includes unit drive waveforms to a pressure generator and causing a nozzle to jet ink droplets such that the droplets land on a medium as one droplet. Each unit drive waveform includes a first pulse waveform for jetting a droplet and a second pulse waveform for pulling back the jetted droplet. The first and second pulse waveforms each include an expansion part for expanding a pressure chamber and a following contraction part for contracting the chamber. The combined drive waveform includes a first unit drive waveform and a following second unit drive waveform. A voltage amplitude of the contraction part of the second pulse waveform in the second unit waveform is greater than that of the contraction part of the second pulse waveform in the first unit drive waveform.

13 Claims, 12 Drawing Sheets

(56) References Cited

FOREIGN PATENT DOCUMENTS

| | | | | |
|---|---|---|---|---|
| JP | 2004098566 | A | * | 4/2004 |
| JP | 2007144659 | A | | 6/2007 |
| JP | 2010179502 | A | | 8/2010 |
| JP | 2017001232 | A | * | 1/2017 |
| JP | 2018122477 | A | * | 8/2018 |

OTHER PUBLICATIONS

CNIPA Notification of the First Office Action for corresponding CN Application No. 201980103299.4; Issued on Feb. 16, 2023.
JPO Notice of Reasons for Refusal for corresponding JP Application No. 2021-566636; Dated Jun. 13, 2023.
International Preliminary Report on Patentability with Written Opinion of the International Searching Authority for International Application No. PCT/2019/050837; Issued on Jun. 28, 2022.
International Search Report for International Application No. PCT/JP2019/050837; Date of Mailing, Mar. 10, 2020.

* cited by examiner

INKJET HEAD DRIVING METHOD AND INKJET RECORDING APPARATUS

CROSS REFERENCE TO RELATED APPLICATIONS

This is the U.S. national stage of application No. PCT/JP2019/050837, filed on Dec. 25, 2019. Priority of which is claimed and also incorporated herein by reference.

TECHNICAL FIELD

The present invention relates to an inkjet head driving method and an inkjet recording apparatus.

BACKGROUND

A known inkjet recording apparatus forms an image by jetting ink from nozzles of an inkjet head such that the ink lands on desired positions. The inkjet head includes pressure chambers that communicate with the nozzles and pressure generators (e.g., piezoelectric elements) that change the pressure on ink in the pressure chambers according to the applied voltage. When a pressure generator receives a voltage signal with a predetermined drive waveform (hereinafter called driving signal), the pressure generator changes the pressure on ink in the pressure chambers, so that the nozzle ejects ink according to the pressure change.

According to a known inkjet recording apparatus, multiple driving signals with adjusted voltages and application timings are continuously applied to the pressure generator so that multiple ink droplets, which are jetted from the nozzles according to the respective driving signals, unite with each other and land on a recording medium (e.g., patent literature 1). According to this technique, the amount of ink droplets landing on the recording medium can be adjusted by changing the number of driving signals applied.

CITATION LIST

Patent Literature

Patent Literature 1: JP2007-144659A

SUMMARY

Technical Problem

However, the amount and speed of ink droplets jetted from the nozzles depend on the behavior of ink in the nozzles when the driving signals are applied. When the ink has low viscosity and is prone to flow in the nozzles or when the ink is successively jetted at a high frequency, the apparatus may not uniform the behavior of ink in the nozzles every time the driving signal is applied. This may cause deviation of the amount and speed of jetted ink droplets from desired values. As a result, ink droplets jetted in response to driving signals may not unite appropriately and may land on positions different from desired positions. This may decrease image quality.

An object of the present invention is to provide an inkjet head driving method and an inkjet recording apparatus that effectively restrain decrease of image quality.

Solution to Problem

To achieve at least one of the abovementioned objects, according to claim 1 of the present invention, there is provided an inkjet head driving method for an inkjet head, wherein the inkjet head includes a nozzle that jets ink and a pressure generator that changes a pressure on ink in a pressure chamber communicating with the nozzle in response to receiving a voltage signal having a predetermined unit drive waveform and thereby causes the nozzle to jet an ink droplet, wherein the method includes applying a voltage signal having a combined drive waveform, the combined drive waveform including multiple unit drive waveforms each of which is the unit drive waveform, to the pressure generator and causing the nozzle to jet multiple ink droplets according to the voltage signal having the combined drive waveform such that the ink droplets unite and land on a recording medium as one droplet, wherein the unit drive waveform includes a first pulse waveform that causes the nozzle to jet an ink droplet and a second pulse waveform that pulls back the ink droplet jetted by the first pulse waveform in a direction opposite an ink jetting direction, wherein the first pulse waveform and the second pulse waveform each include an expansion part that expands the pressure chamber and a contraction part that is applied after the expansion part and that contracts the pressure chamber, wherein the combined drive waveform includes a first unit drive waveform being the unit drive waveform and a second unit drive waveform being the unit drive waveform applied after the first unit drive waveform, wherein a voltage amplitude of the contraction part of the second pulse waveform in the second unit drive waveform is greater than a voltage amplitude of the contraction part of the second pulse waveform in the first unit drive waveform.

Additionally or alternatively, in this or other embodiments, there is provided the inkjet head driving method according to claim 1, wherein a last unit drive waveform in the combined drive waveform is the second unit drive waveform.

Additionally or alternatively, in this or other embodiments, an electric potential of the first unit drive waveorm varies within a range not exceeding a predetermined reference electric potential, wherein the second pulse waveform of the second unit drive waveform has a part that is higher than the reference electric potential.

Additionally or alternatively, in this or other embodiments a last unit drive waveform in the combined drive waveform is the second unit drive waveform, wherein an acoustic length (AL) is half an acoustic resonance cycle of a pressure wave in the pressure chamber, wherein in the last second unit drive waveform in the combined drive waveform, the second pulse waveform has the part that is higher than the reference electric potential and a length of which is 1 AL.

Additionally or alternatively, in this or other embodiments the combined drive waveform includes a series of repetitive waveforms each of which includes the first unit drive waveform of a predetermined number, wherein each of the repetitive waveforms ends at the reference electric potential.

Additionally or alternatively, in this or other embodiments each of the repetitive waveforms includes two first unit drive waveforms each of which is the first unit drive waveform, wherein an acoustic length (AL) is half an acoustic resonance cycle of a pressure wave in the pressure chamber, wherein a length of each of the repetitive waveforms is equal to or greater than 3.5 AL and less than 4.5 AL.

Additionally or alternatively, in this or other embodiments the length of each of the repetitive waveforms is 4 AL.

Additionally or alternatively, in this or other embodiments each of the repetitive waveforms includes the single first unit drive waveform, wherein an acoustic length (AL) is half an acoustic resonance cycle of a pressure wave in the pressure chamber, wherein a length of the first unit drive waveform is 2 AL.

Additionally or alternatively, in this or other embodiments the combined drive waveform is extended or shrunken in a time direction according to a distance between an opening of the nozzle and the recording medium such that the greater the distance is, the longer the combined drive waveform is in the time direction.

Additionally or alternatively, in this or other embodiments the combined drive waveform is extended or shrunken in a time direction according to a viscosity of the ink to be jetted from the nozzle such that the lower the viscosity is, the longer the combined drive waveform is in the time direction.

Additionally or alternatively, in this or other embodiments a pulse width of the first pulse waveform in the second unit drive waveform is equal to or greater than a pulse width of the first pulse waveform in the first unit drive waveform.

Additionally or alternatively, in this or other embodiments an acoustic length (AL) is ½ of an acoustic resonance cycle of a pressure wave in the pressure chamber, wherein a pulse width of the first pulse waveform is equal to or greater than 0.7 AL and equal to or less than 1 AL.

Additionally or alternatively, in this or other embodiments the pulse width of the first pulse waveforms is equal to or greater than 0.7 AL and equal to or less than 0.9 AL.

Additionally or alternatively, in this or other embodiments an acoustic length (AL) is half an acoustic resonance cycle of a pressure wave in the pressure chamber, wherein in the unit drive waveform, a pulse width of the second pulse waveform is equal or greater than 0.3 AL and equal to or less than 0.6 AL and shorter than a pulse width of the first pulse waveform.

Additionally or alternatively, in this or other embodiments the combined drive waveform includes a vibration waveform before the initial unit drive waveform, wherein the vibration waveform vibrates a liquid ink surface in the nozzle.

In another embodiment, there is provided an inkjet recording apparatus including: an inkjet head that includes a nozzle that jets ink and a pressure generator that changes a pressure on ink in a pressure chamber communicating with the nozzle in response to receiving a voltage signal having a predetermined unit drive waveform and thereby causes the nozzle to jet an ink droplet; and a drive controller that controls voltage signals to be applied to the pressure generator, wherein the drive controller applies a voltage signal having a combined drive waveform, the combined drive waveform including multiple unit drive waveforms each of which is the unit drive waveform, to the pressure generator and causes the nozzle to jet multiple ink droplets according to the voltage signal having the combined drive waveform such that the ink droplets unite and land on a recording medium as one droplet, wherein the unit drive waveform includes a first pulse waveform that causes the nozzle to jet an ink droplet and a second pulse waveform that pulls back the ink droplet jetted by the first pulse waveform in a direction opposite an ink jetting direction, wherein the first pulse waveform and the second pulse waveform each include an expansion part that expands the pressure chamber and a contraction part that is applied after the expansion part and that contracts the pressure chamber, wherein the combined drive waveform includes a first unit drive waveform being the unit drive waveform and a second unit drive waveform being the unit drive waveform applied after the first unit drive waveform, wherein a voltage amplitude of the contraction part of the second pulse waveform in the second unit drive waveform is greater than a voltage amplitude of the contraction part of the second pulse waveform in the first unit drive waveform.

Advantageous Effects of Invention

According to the present invention, decrease of image quality can be effectively restrained.

DESCRIPTION OF EMBODIMENTS

Hereinafter, embodiments of an inkjet head driving method and an inkjet recording apparatus according to the present invention are described with reference to the drawings.

[Configuration of Inkjet Recording Apparatus]

Figure 1:
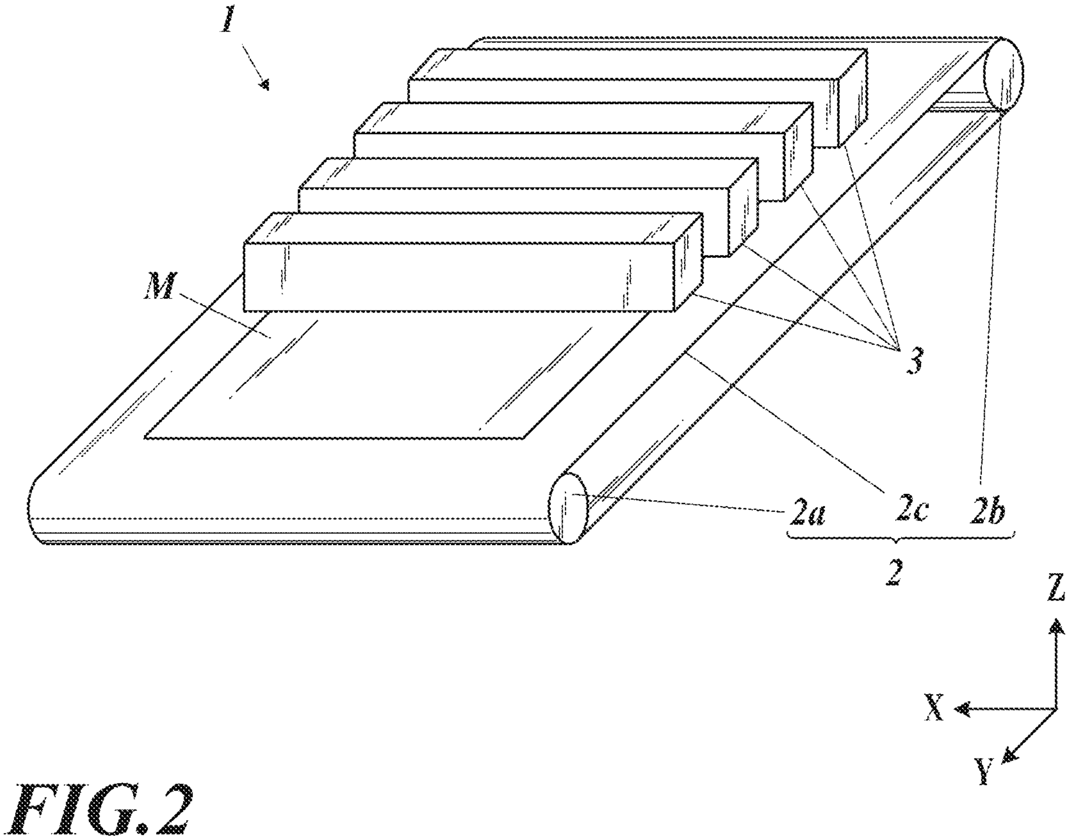
FIG. 1 is a schematic configuration of an inkjet recording apparatus.

FIG. 1 shows a schematic configuration of an inkjet recording apparatus 1 as an embodiment of the present invention.

The inkjet recording apparatus 1 includes a conveyor 2 and head units 3.

The conveyor 2 includes a loop-shaped conveyor belt 2*c* supported from inside by two conveyor rollers 2*a*, 2*b*. The conveyor rollers 2*a*, 2*b* are rotatable on the central axis extending in the X direction in FIG. 1. The conveyor 2 rotates the conveyor roller 2*a* with a not-illustrated conveyor motor so that the conveyor belt 2*c* circularly moves. The conveyor 2 thus conveys recording media M placed on the conveyor surface of the conveyor belt 2*c* in the moving direction of the conveyor belt 2*c* (conveying direction, Y direction in FIG. 1).

The recording media M are sheets of paper with a specific size, for example. The recording media M are fed onto the conveyor belt 2*c* by a not-illustrated paper feeding device. After images are formed with ink jetted by the head units 3, the recording media M are ejected to a predetermined sheet receiver. The recording media M may be rolled paper. The recording media M can be various kinds of media that allow fixing of ink landed on the surface, such as paper (e.g., plain paper, coated paper), fabric, and sheets of resin.

The head unit 3 forms images on the recording media M, which are conveyed by the conveyor 2, by jetting ink at appropriate timings on the basis of image data. The inkjet recording apparatus 1 in this embodiment includes four head units 3 for the respective four colors of yellow (Y), magenta (M), cyan (C), and black (K). The head units 3 are arranged at predetermined intervals in the order of Y, M, C, and K from the upstream of the conveying direction of the recording media M. The head units 3 are arranged such that ink is jet in the vertically downward direction. The number of head units 3 may be more than or less than four.

Figure 2:
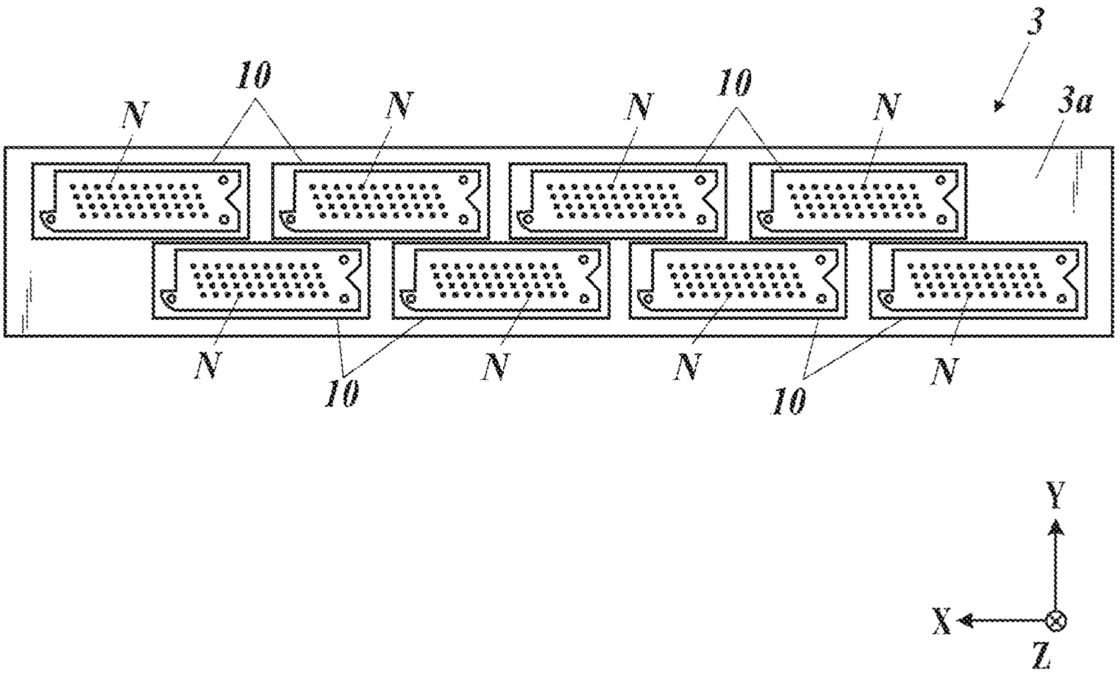
FIG. 2 is a schematic configuration of a head unit.

FIG. 2 shows a plan view of a schematic configuration of each head unit 3. In FIG. 2, the head unit 3 is seen from the side facing the conveyance surface of the conveyor belt 2*c*.

The head unit 3 includes a plate-shaped supporter 3*a* and multiple (herein, eight) inkjet heads 10 fitted in perforations of the supporter 3*a* and fixed to the supporter 3*a*. Each inkjet head 10 is fixed to the supporter 3*a* such that the inkjet surface with openings of nozzles N is exposed to the conveyor belt 2*c* though the perforation of the supporter 3*a*.

Each inkjet head 10 has multiple nozzles N arranged at regular intervals in the X direction. In this embodiment, each inkjet head 10 has four rows of nozzles N (nozzle rows) each of which has nozzles N arranged one-dimensionally at regular intervals. The four nozzle rows are staggered in the X direction such that the positions of the nozzles N do not overlap in the X direction. The number of nozzle rows of the inkjet head 10 is not limited to four but may be less than or more than four.

The eight recording heads 10 of the head unit 3 are staggered such that the positions of the nozzles N are continuous in the X direction. The X-direction area of the nozzles N of the head unit 3 covers the X-direction width of the recordable region of the recording medium M on which images can be formed. In forming images, each head unit 3 is fixed to a position and jets ink from the nozzles N to positions on the recording medium M being conveyed at predetermined intervals in the conveying direction. The head unit 3 thus forms images with the single-pass system.

Figure 3:
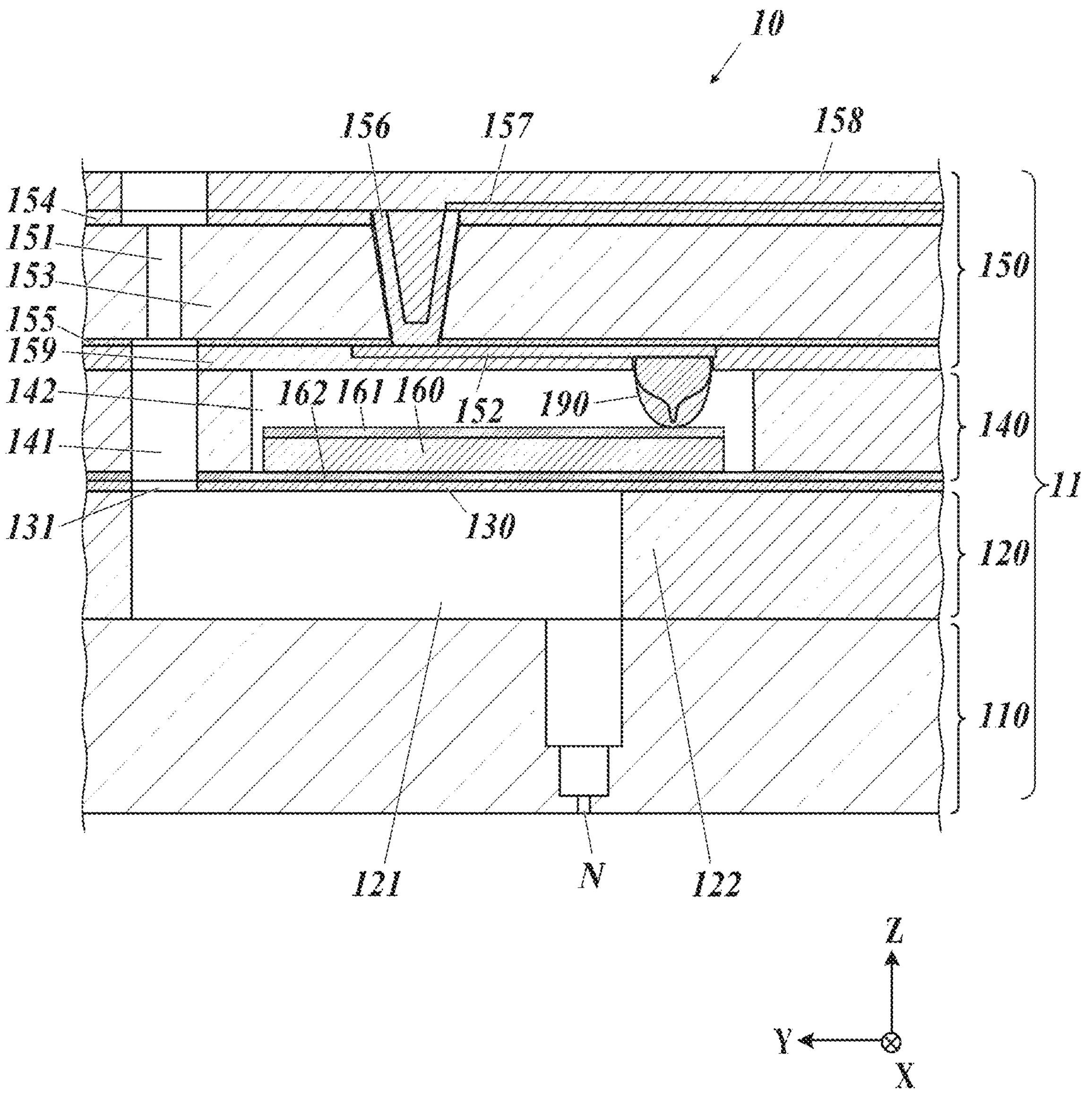
FIG. 3 is a cross-sectional view of an inkjet mechanism of an inkjet head.

FIG. 3 shows a cross-sectional view of the inkjet mechanism of each inkjet head 10.

The inkjet head 10 includes the nozzles N and a head chip 11. The head chip 11 includes a mechanism for jetting ink from the nozzles N. Hereinafter, +Z direction is the upward direction, and −Z direction is the downward direction.

The head chip 11 includes a lamination of four substrates. The bottom substrate of the head chip 11 is a nozzle substrate 110. The nozzle substrate 110 has multiple nozzles N. From the openings of the nozzles N, ink is jetted in a direction substantially vertical to the exposed surface (inkjet surface) of the nozzle substrate 110. On the other side of the nozzle substrate 110 from the inkjet surface, a pressure chamber substrate 120, a spacer substrate 140, and a wiring substrate 150 are adhered upwards in this order, thereby forming a lamination. Hereinafter, the nozzle substrate 110, pressure chamber substrate 120, spacer substrate 140, and wiring substrate 150 may be each or altogether called the layer substrate(s) 110, 120, 140, 150.

The layer substrates 110, 120, 140, 150 have ink ducts that communicate with respective nozzles N. The ink ducts are open to the exposed surface (upward surface) of the wiring substrate 150. On the exposed surface of the wiring substrate 150, a not-illustrated common ink chamber is provided so as to cover all the openings. The ink stored in the common ink chamber is supplied to the respective nozzles N through the openings of the wiring substrate 150.

The pressure chamber 121 is provided in the middle of the ink duct. The pressure chamber 121 penetrates the pressure chamber substrate 120 in the top-bottom direction. The pressure chamber substrate 120 includes a flexible oscillation plate 130 that covers the spacer substrate 140 side of the pressure chamber 121. That is, the oscillation plate 130 constitutes part of the wall surface of the pressure chamber 121.

The oscillation plate 130 has an opening 131 that constitutes part of the ink duct. The other side of the oscillation plate 130 from the pressure chamber 121 is adhered to a plate-shaped piezoelectric element 160 (pressure generator) via a second electrode 162.

The spacer substrate 140 has an ink conduction duct 141 that passes through both surfaces of the spacer substrate 140 and a housing part 142 (housing space). The ink conduction duct 141 constitutes part of the ink duct, which connects the common ink chamber to the nozzle N. The housing 142 houses the piezoelectric element 160 positioned on the oscillation plate 130.

The piezoelectric element 160 is an actuator sandwiched between a first electrode 161 and the second electrode 162. Preferably, the piezoelectric element 160 may be made of lead zirconate titanate (PZT). However, the piezoelectric element 160 may be made of other piezoelectric materials, such as quartz, lithium niobate, barium titanate, lead titanate, lead metaniobate, and PolyVinylidene DiFluoride. The second electrode 162 is formed between the bottom surface of the piezoelectric element 160 and the oscillation plate 130. The first electrode 161 is laid/formed on the top surface of the piezoelectric element 160. The first electrode 161 is formed to cover the entire top surface of the piezoelectric element 160. The second electrode 162 is formed to cover the substantially entire top surface of the oscillation plate 130.

When the oscillation plate 130 is made of an electrical conducting material (e.g., metal), the second electrode 162 may be omitted and the oscillation plate 130 may be used as one electrode. In the case, the piezoelectric element 160 is directly adhered to the oscillation plate 130.

The first electrode 161 is electrically connected to the wiring 152 provided at the bottom-surface side of the wiring substrate 150 via an electrical conducting connector 190.

The second electrode 162 is connected to a wiring at a reference electric potential via a not-illustrated wire.

The wiring substrate 150 includes a plate-shaped interposer 153, a penetrating electrode 156 that penetrates the interposer 153, and a wiring 157 that is placed on the top surface of the interposer 153 and connected to the penetrating electrode 156. The penetrating electrode 156 is connected to the wiring 152 on the bottom surface of the interposer 153. Between the interposer 153 and the wiring 157, an insulation layer 154 is provided. Between the interposer 153 and the wiring 152, an insulation layer 155 is provided. The top surface of the wiring substrate 150 is covered by an insulation layer 158. The bottom surface of the wiring substrate 150 is covered by an insulation layer 159. The interposer 153 has a perforation 151 that constitutes the ink duct.

In the head chip 11 configured as described above, when the wiring 157 receives a voltage signal (driving signal) with a drive waveform for driving the piezoelectric element 160, the driving signal is supplied to the first electrode 161 via the wiring 157, the penetrating electrode 156, the wiring 152, and the connector 190. The first electrode 161 having received the driving signal and the second electrode 162 at the reference electric potential have different voltages.

According to the voltage difference, the piezoelectric element 160 is displaced (piezoelectric element 160 expands/contracts), so that the oscillation plate 130 deforms and applies a pressure corresponding to the deformation amount to the ink in the pressure chamber 121. Thus, ink is pushed out from the pressure chamber 121 or pulled back from the nozzle N by the pressure applied to the ink in the pressure chamber 121.

Herein, when the first electrode 161 has a negative electric potential with respect to the reference electric potential (negative voltage is applied to the first electrode 161), the piezoelectric element 160 deforms in the direction of depressurizing the ink (the direction of expanding the pressure chamber 121). When the first electrode 161 has a positive electric potential with respect to the reference electric potential (positive voltage is applied to the first electrode 161), the piezoelectric element 160 deforms in the direction of pressurizing the ink (the direction of contracting the pressure chamber 121). For example, assume that the first electrode 161 has a negative electric potential with respect to the reference electric potential and the pressure chamber 121 expands. When the first electrode 161 is then set to a positive electric potential with respect to the reference electric potential, the pressure chamber 121 contracts and applies pressure to ink, thereby jetting the ink from the nozzle N. The waveform of the driving signal to be applied to the first electrode 161 is described later in detail.

Figure 4:
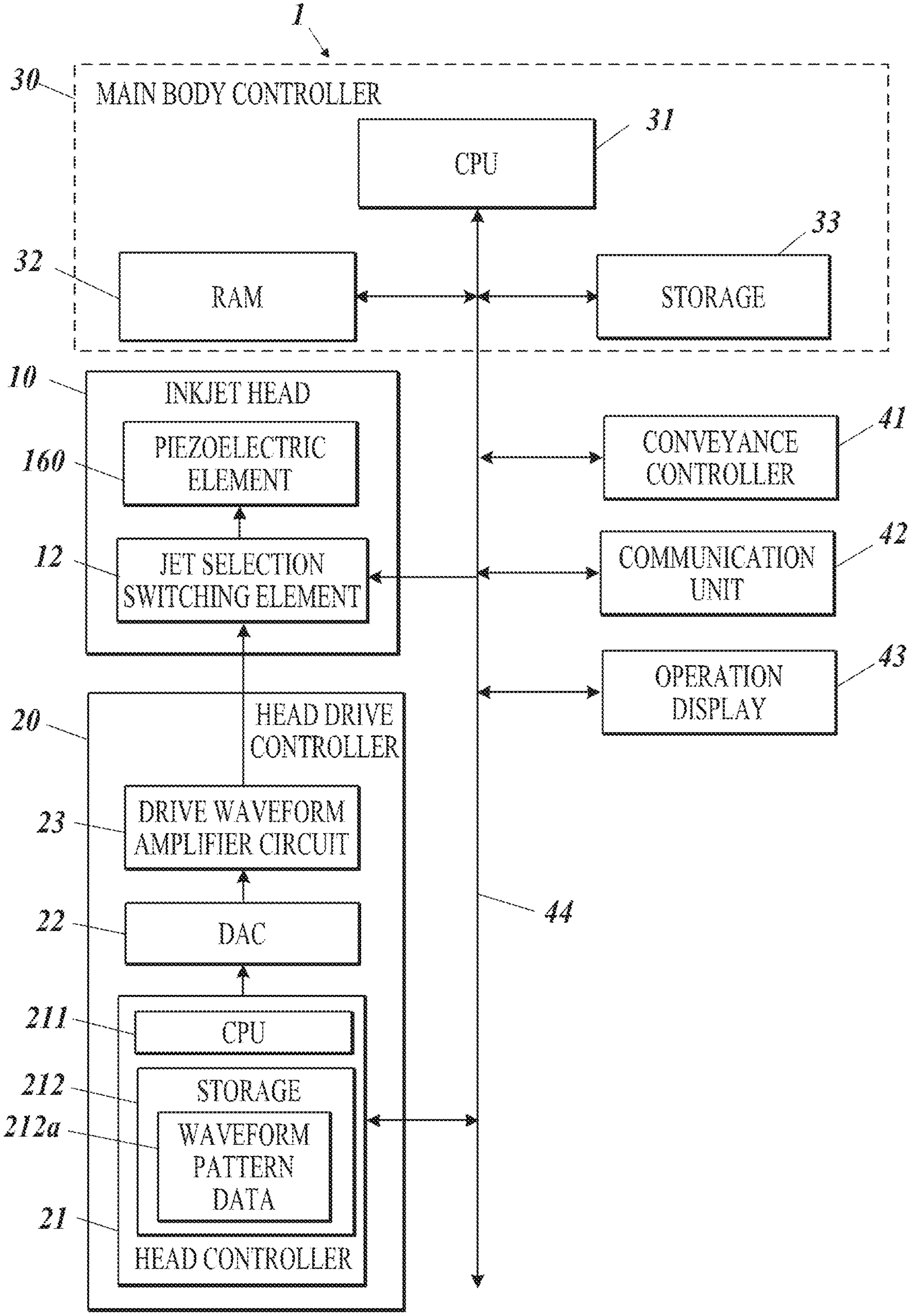
FIG. 4 is a block diagram showing functional components of the inkjet recording apparatus.

FIG. 4 is a block diagram showing functional components of the inkjet recording apparatus 1.

The inkjet recording apparatus 1 includes a main body controller 30, inkjet heads 10, a head drive controller 20 (drive controller), a conveyance controller 41, a communication unit 42, and an operation display 43. These components are connected via a bus 44 to send/receive signals to/from each other.

The main body controller 30 centrally controls the entire operation of the inkjet recording apparatus 1. The main body controller 30 includes a central processing unit 31 (CPU), a random access memory 32 (RAM), and a storage 33.

The CPU 31 performs various arithmetic processes. The CPU 31 reads control programs stored in the storage 33 and performs various control processes for recording images and doing image recording settings.

The RAM 32 provides a working memory space for the CPU 31 and stores temporary data. The storage 33 includes a nonvolatile memory that stores the control programs and setting data. The storage 33 may also include a dynamic random access memory (DRAM) that temporarily stores settings on droplet jetting instructions (print jobs), which are obtained externally via the communication unit 42, and image data to be recorded.

Each of the inkjet heads 10 includes the above-described head chip 11, which includes the piezoelectric element 160, and a jet selection switching element 12.

The jet selection switching element 12 switches an ink jetting driving signal and a no-ink-jetting driving signal to be applied by the head drive controller 20 to each piezoelectric element 160. The jet selection switching element 12 supplies driving signals indicating whether ink is jetted from the respective nozzles N on the basis of image data to be recorded. The jet selection switching element 12 thus switches pressure variation patterns to be applied to the ink in each nozzle N. The driving signal in not jetting ink has a small amplitude that vibrates the liquid surface (meniscus) of the ink of the nozzle N but that does not cause ink jetting.

The head drive controller 20 outputs the driving signals to drive the piezoelectric elements 160 of the inkjet head 10 at appropriate timings on the basis of each pixel data of the image to be recorded. The head drive controller 20 may be integrally formed on a substrate or the like or may be dispersed in several parts of the inkjet recording apparatus 1. Part of or whole structure of the head drive controller 20 may be disposed in the inkjet head 10. The head drive controller 20 includes a head controller 21, a drive waveform amplifier circuit 23, and a digital-to-analog converter (DAC) 22.

The head controller 21 controls the operation of the head drive controller 20 on the basis of the presence and contents of image data to be recorded. The head controller 21 includes a CPU 211 and a storage 212. The storage 212 stores waveform pattern data 212*a* that includes information on drive waveform patterns for jetting ink from the nozzles N and vibrating the meniscus. The waveform pattern data 212*a* retains data of drive waveform patterns as digital discrete value array data. The storage 212 is a nonvolatile memory, such as a ROM or rewritable flash memory.

The CPU 211 selects a waveform pattern for causing the head drive controller 20 to output the driving signal with an appropriate waveform pattern, on the basis of image data as a recording target in the storage 212 or storage 33. The CPU 211 outputs the selected waveform pattern at appropriate timings according to not-illustrated clock signals (synchronization signals). The head controller 21 may be integrated with the main body controller 30.

The DAC 22 obtains an analog signal converted from the waveform pattern data of each driving waveform output at a predetermined clock frequency by the head controller 21, and outputs the analog signal to the drive waveform amplifier circuit 23.

The drive waveform amplifier circuit 23 performs an amplification operation (voltage amplification and then current amplification) on the signal input by the DAC 22, and outputs the amplified driving signal to each of the piezoelectric elements 160. Thus, the piezoelectric element 160 receives the driving signal that includes a trapezoidal-shaped voltage waveform and that becomes negative and positive with respect to the reference electric potential.

The conveyance controller 41 rotates the conveyor roller 2*a* by activating the motor for rotating the conveyor roller 2*a*, thereby controlling conveyance of the recording medium M with the conveyor belt 2*c* at appropriate timings and speed. The conveyance controller 41 may be integrated with the main body controller 30.

The communication unit 42 sends and receives data to and from external devices in accordance with a predetermined communication protocol. The communication unit 42 includes a hardware driver (e.g., network card) for connecting terminals and communications corresponding to the applied communication protocol.

The operation display 43 displays status information and menu regarding image recording and receives input operations by a user. For example, the operation display 43 includes a liquid crystal panel as the display screen, a driver for the crystal panel, and a touchscreen superimposed on the crystal panel. The operation display 43 outputs an operation detection signal corresponding to the position touched by the user and the touch operation type to the main body controller 30.

[Inkjet Head Driving Method]

Next, the method of driving the inkjet head 10 of the inkjet recording apparatus 1 according to this embodiment is described.

The method of driving the inkjet head 10 in this embodiment uses the voltage signal having a combined drive waveform. The combined drive waveform is a combination of multiple unit drive waveforms each of which causes one ink droplet to jet. When the voltage signal having the combined drive waveform is applied to the first electrode 161 of the piezoelectric element 160, the nozzle N can jet multiple ink droplets such that the droplets unite and land on the recording medium as one droplet, depending on the applied voltage signal having the combined drive waveform. Hereinafter, applying the voltage signal having the drive waveform to the piezoelectric element 160 may be simply expressed as "applying the driving waveform".

Figure 5:
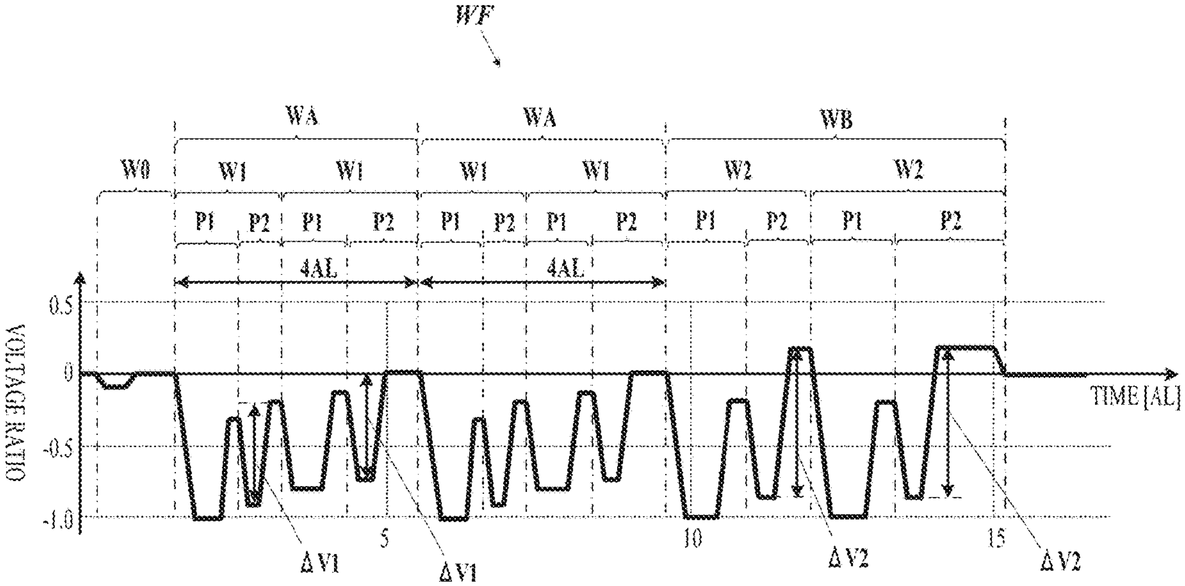
FIG. 5 shows a combined drive waveform of the inkjet recording apparatus for jetting ink.

FIG. 5 shows the combined drive waveform WF for jetting ink from the inkjet recording apparatus 1.

In FIG. 5, the combined drive waveform WF is depicted using the electric potential ratio, where the reference electric potential is zero (0) and the minimum negative electric potential is −1. The reference electric potential is the electric potential in stand-by time, in which no ink jetting operation is performed.

The unit of the time axis is the acoustic length (AL). The AL is ½ of the acoustic resonance cycle of the pressure wave in the pressure chamber 121. The AL is normally a few to several microseconds.

The combined drive waveform WF in FIG. 5 includes a vibration waveform W0, four first unit drive waveforms W1, and two second unit drive waveforms W2. Each of the first unit drive waveforms W1 causes an ink droplet to jet. The second unit drive waveforms W2 are applied after the first unit drive waveforms W1. Each of the second unit drive waveforms W2 causes an ink droplet to jet. Hereinafter, the first unit drive waveform W1 and the second unit drive waveform W2 may be called "unit drive waveform Wn" in a case where either one of them is applicable. The combined drive waveform WF in FIG. 5 therefore includes six unit drive waveforms Wn. When this combined drive waveform WF is applied to the piezoelectric element 160, the nozzle N can jet six ink droplets such that the droplets unite and land on the recording medium M as one droplet. Hereinafter, the six ink droplets having united as one droplet may be called "a large droplet".

The vibration waveform W0 is applied before the first unit drive waveform W1 to vibrate the meniscus of the nozzle N. This can restrain variations of inkjet characteristics caused by the dry ink liquid surface (thickened ink).

Figure 6:
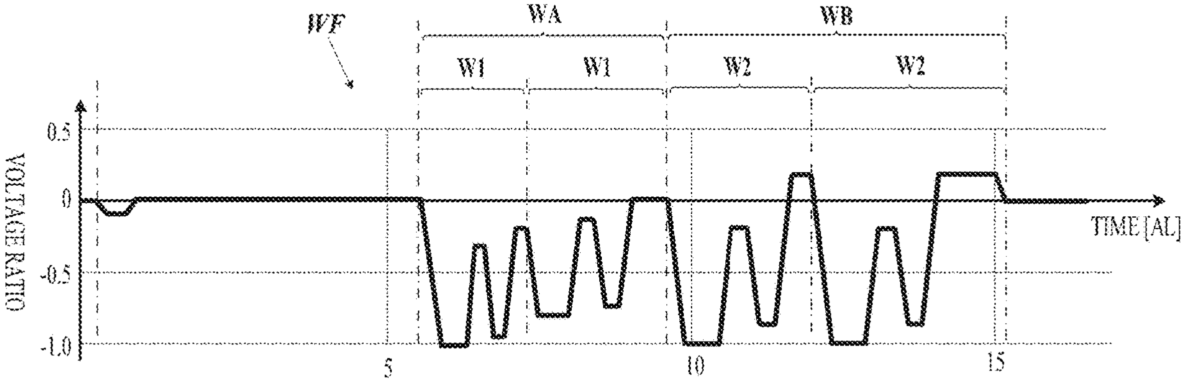
FIG. 6 is a figure showing the combined drive waveform for jetting a medium droplet.

FIG. 6 shows the combined drive waveform WF that omits the initial two first unit drive waveforms W1 and that includes the remaining four unit drive waveforms (W1, W2). By applying such a combined drive waveform WF, four ink droplets can unite with each other and land on the recording medium M as one droplet. Hereinafter, the four ink droplets that have united into one droplet may be called "a medium droplet".

Figure 7:
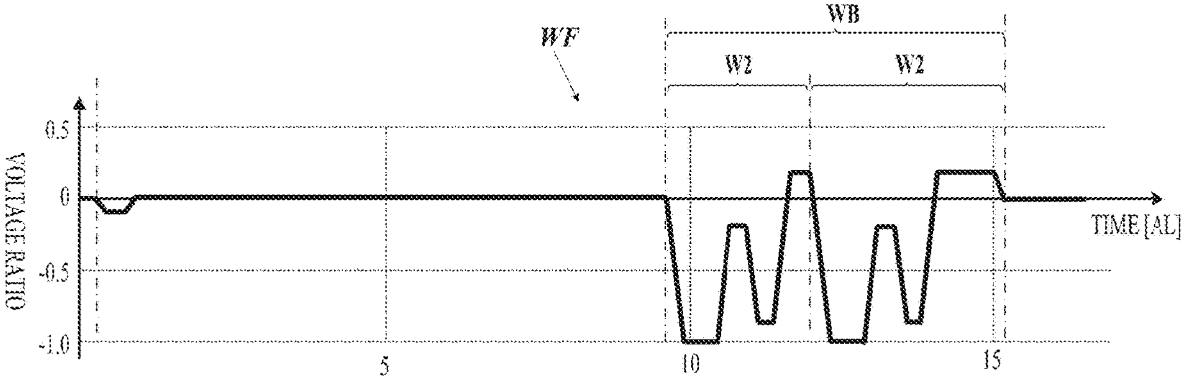
FIG. 7 is a figure showing the combined drive waveform for jetting a small droplet.

FIG. 7 shows the combined drive waveform WF that omits the initial four first unit drive waveforms W1 and that includes the remaining two second unit drive waveforms W2. By applying such a combined drive waveform WF, two ink droplets can unite and land on the recording medium M as one droplet. Hereinafter, the two ink droplets that have united into one droplet may be called "a small droplet".

In the combined drive waveform WF in FIG. 5, the two first unit drive waveforms W1 that come first and second constitute a repetitive waveform WA. Similarly, the first unit drive waveforms W1 that come third and fourth constitute a repetitive waveform WA. These two repetitive waveforms WA are identical. With the combined drive waveform WF, the repetitive waveforms WA with the identical shape are successively applied.

In the combined drive waveform WF, the last two second unit drive waveforms W2 constitute a terminal waveform WB. Thus, the last unit drive waveform in the combined drive waveform WF is the second unit drive waveform W2.

The above-described combined drive waveform WF in this embodiment allows ink droplets to unite at the time of being jetted from the nozzle N. Specifically, six ink droplets connecting to each other in a pillar shape are jetted from the nozzle N and land on the recording medium M without separating from each other while flying. Hereinafter, the composition and effect of the repetitive waveform WA and the terminal waveform WB for allowing the above-described ink jetting are described.

[Repetitive Waveform WA]

Figure 8:
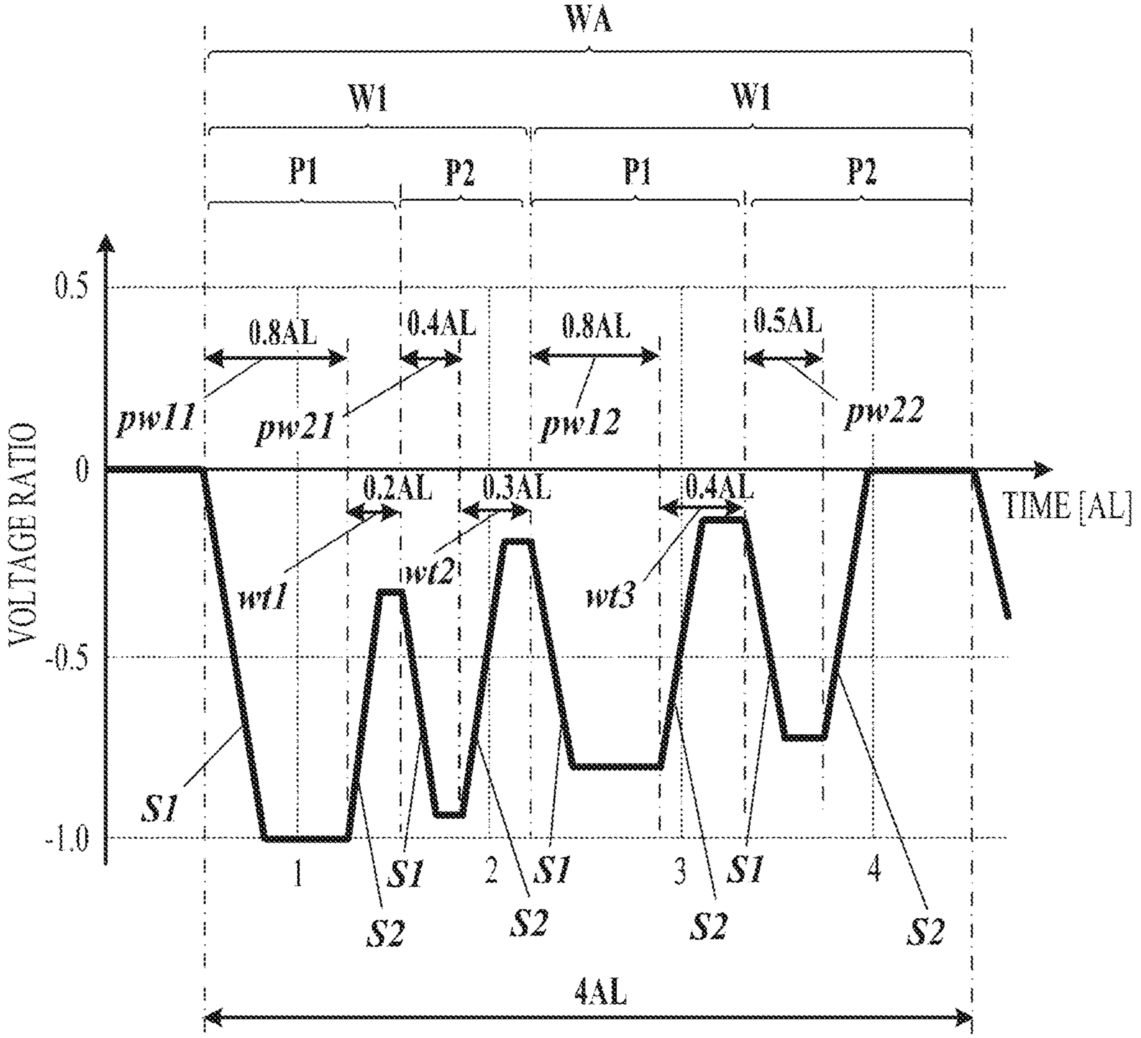
FIG. 8 shows an enlarged repetitive waveform.

FIG. 8 shows the enlarged repetitive waveform WA.

In the repetitive waveform WA, each of the two first unit drive waveforms W1 includes: a main pulse P1 (first pulse waveform) that causes an ink droplet to jet from the nozzle N; and a pullback pulse P2 (second pulse waveform) that pulls back the ink droplet jetted by the main pulse P1 in the direction opposite the ink jetting direction. The combination of the main pulse P1 and the pullback pulse P2 causes one ink droplet to jet from the nozzle N.

The main pulse P1 includes: an expansion part S1 where the electric potential decreases; and an contraction part S2 where the electric potential increases after the expansion part S1. At the expansion part S1 of the main pulse P1, the piezoelectric element 160 changes such that the pressure chamber 121 expands. At the contraction part S2 after the expansion part S1, the piezoelectric element 160 changes such that the pressure chamber 121 contracts in the direction of returning to its original shape. The expansion and contraction of the pressure chamber 121 is caused at the timing the pressure wave in the pressure chamber 121 resonates, so that the ink in the pressure chamber 121 is pressurized and jets from the nozzle N.

In the main pulse P1, the length between the timing when the expansion part S1 starts and the timing when the contraction part S2 starts is defined as the pulse width of the main pulse P1. The pulse width of the main pulse P1 is set within the range of 0.7 AL≤pulse width of main pulse P1≤1 AL, or more preferably, 0.7 AL≤pulse width of main pulse P1≤0.9 AL. In this embodiment, the pulse widths (pw11, pw12) of two main pulses P1 in two first unit drive waveforms W1 are both 0.8 AL.

Like the main pulse P1, the pullback pulse P2 includes an expansion part S1 and a contraction part S2. In the pullback pulse P2, the length between the timing when the expansion part S1 starts and the timing when the contraction part S2 starts is defined as the pulse width of the pullback pulse P2. The pulse width of the pullback pulse P2 is set in the range of 0.3 AL≤pulse width of pullback pulse P2≤0.6 AL. The pulse width of the pullback pulse P2 is shorter than the pulse width of the main pulse P1. In this embodiment, the pulse width (pw21) of the pullback pulse P2 is 0.4 AL in the first unit drive waveform W1 that comes first, whereas the pulse width (pw22) of the pullback pulse P2 is 0.5 AL in the first unit drive waveform W1 that comes second.

The wait time wt1 between the pulse width pw11 and the pulse width pw21 is 0.2 AL. The wait time wt2 between the pulse width pw21 and the pulse width pw12 is 0.3 AL. The wait time wt3 between the pulse width pw12 and the pulse width pw22 is 0.4 AL.

The expansion part S1 of the pullback pulse P2 is applied at the timing of restraining the reverberant vibration by the main pulse P1, so that the pressure chamber 121 expands and applies power to the ink droplet in the direction of pulling back the jetted ink droplet. Accordingly, the speed of the ink droplet jetted by the main pulse P1 can be decreased.

As the ink droplet is pulled back by the pullback pulse P2, the meniscus that has withdrawn into the nozzle N (in the direction opposite the jetting direction) by the effect of the main pulse P1 can move forward toward the opening of the nozzle N. The forward movement of the meniscus can increase the amount of the ink droplet to be jet by the next unit drive waveform Wn. Such an increase of the amount of the ink droplet can restrain increase of the speed of the ink droplet. Further, as the meniscus moves forward and comes closer to its normal position, ink can be jetted with a desired amount and at a desired speed at a high frequency.

The electric potential of the first unit drive waveform W1 changes in the range up to the reference electric potential. Specifically, in the repetitive waveform WA, the electric potential decreases to the voltage ratio of −1.0 at the expansion part S1 of the first main pulse P1. The electric potential then gradually increases along the two first unit drive waveforms W1 and returns to the reference electric potential at the end of the repetitive waveform WA. Concerning the maximum potentials of the respective contraction parts S2 in the repetitive waveform WA, the contraction part S2 in the first main pulse P1 has the lowest maximum potential. The maximum potential of the contraction part S2 then gradually increases in the order of the subsequent pullback pulse P2, main pulse P1, and pullback pulse P2, and eventually reaches the reference electric potential at the end of the contraction part S2 of the last pullback pulse P2.

The repetitive waveform WA has the above-described electric potential transition, so that the contraction part S2 of the pullback pulse P2 in the first unit drive waveform W1 has a small voltage amplitude ΔV1 (FIG. 5). This restrains acceleration of ink caused by the contraction of the pressure chamber 121, which contracts by the contraction part S2 of the pullback pulse P2. Accordingly, the speed of the ink droplet jetted by the combination of the main pulse P1 and the pullback pulse P2 in the first unit drive waveform W1 can be substantially decreased. The speed of the ink droplet jetted by the first unit drive waveform W1 is approximately 1 meter/second, for example.

The electric potential reaches the reference electric potential at the end of each repetitive waveform WA. As the electric potential returns to the reference electric potential, two or more identical repetitive waveforms WA can be applied repetitively.

The repetitive waveform WA is adjusted such that its entire length is within the range of 3.5 AL≤ the entire length<4.5 AL, or more preferably, closer to 4 AL. In this embodiment, the length of the repetitive waveform WA is 4 AL. By this feature, the pressure wave in the nozzle at the end of the former repetitive waveform WA accelerates the ink to be jetted by the latter repetitive waveform WA. This restrains such a failure that the ink droplet jetted by the latter repetitive waveform WA is too slow to unite with other droplets.

The first unit drive waveforms W1 in the repetitive waveform WA may not have an equal length, as long as their lengths meet the above requirement.

Figure 9:
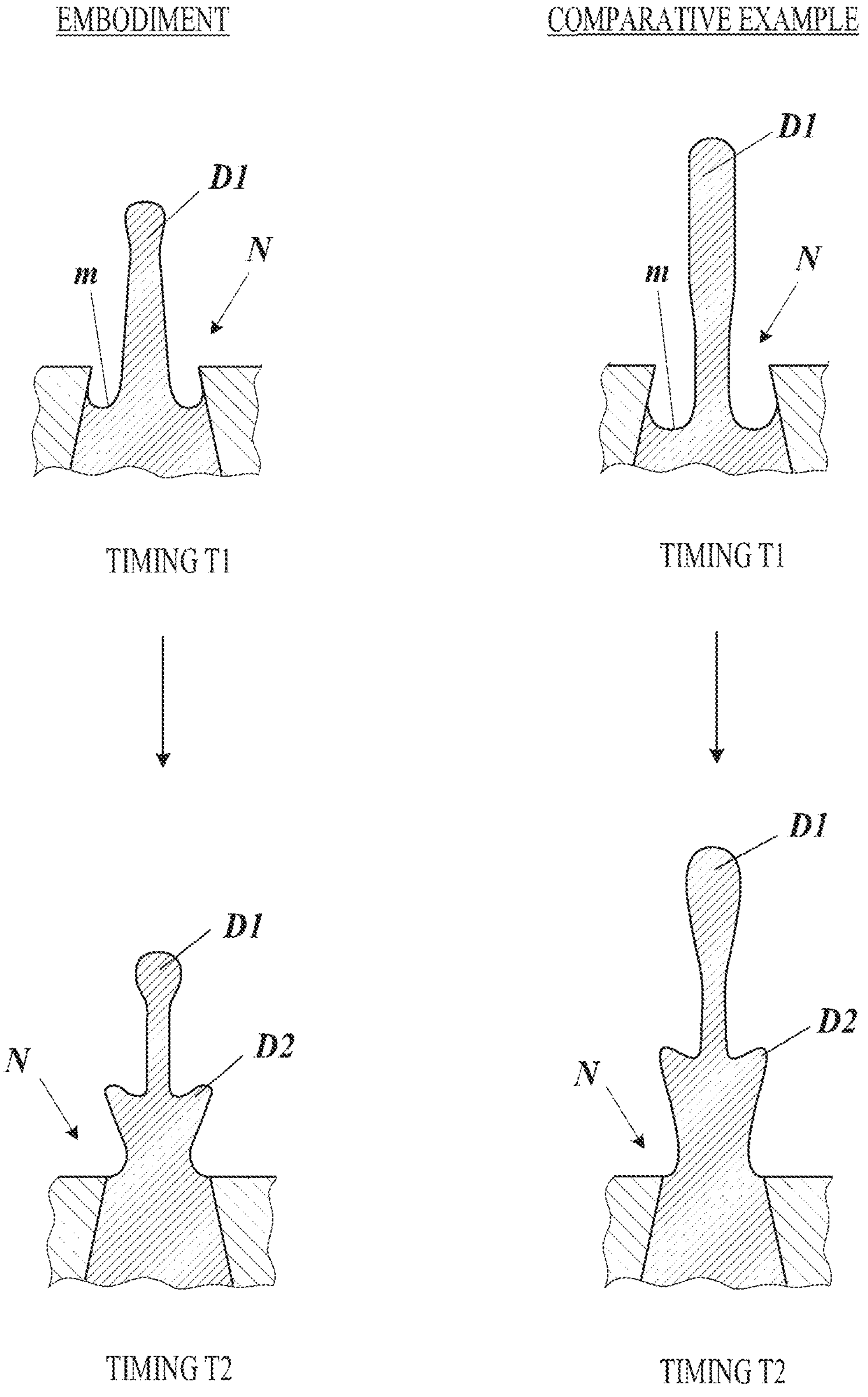
FIG. 9 shows the behavior of ink jetted by a first unit drive waveform.

FIG. 9 is a figure to explain the behavior of ink jetted by the first unit drive waveform W1.

The left part of FIG. 9 shows the behavior of ink jetted by the first unit drive waveform W1 of this embodiment. The right part of FIG. 9 shows the behavior of ink jetted by a unit drive waveform of a comparative example. The unit drive waveform of the comparative example includes a main pulse P1 but does not include a pullback pulse P2.

The upper part of FIG. 9 shows the timing T1 at which a first ink droplet D1 is jetted from the nozzle N by the unit drive waveform that comes first.

In this embodiment, at the timing T1, the jetted ink droplet D1 is pulled back toward the nozzle N by the applied pullback pulse P2. The droplet D1 therefore comes closer to the opening of the nozzle N as compared with the droplet in the comparative example.

Further, in this embodiment, the meniscus of the droplet D1 moves forward in the jetting direction as the droplet D1 is pulled back to the nozzle N side. The meniscus m in this embodiment therefore comes closer to the opening of the nozzle N than the meniscus m in the comparative example.

The bottom part of FIG. 9 shows the timing T2 at which a second ink droplet D2 is jetted from the nozzle N by the main pulse P1 of the unit drive waveform that comes second.

In this embodiment, the speed of the jetted ink D2 at the timing T2 is kept low. This is because the meniscus m has moved forward at the timing T1 and the amount of the second droplet D2 has increased. As the amount of the second droplet D2 increases, the speed thereof decreases. In this embodiment, both the droplets D1, D2 are jetted at low speeds, so that the droplets D1, D2 connect with each other and are jetted as one droplet from the nozzle N. Similarly, inks are jetted at low speed by the first unit drive waveforms W1 that come third and fourth. Accordingly, the third and fourth ink droplets D3, D4 connect with the droplets D1, D2 that have been jetted earlier and are jetted as one droplet from the nozzle N.

On the other hand, the second ink droplet D2 in the comparative example flies faster and farther at the timing T2 than the second ink droplet D2 in this embodiment. This is because no pullback pulse P2 is applied and the meniscus m has moved backward when the second droplet D2 is jetted at the timing T1. As a result, the droplet D2 is likely to have a small amount and fly at a greater speed. Thus, both of the droplets D1, D2 in the comparative example fly faster than the droplets D1, D2 in this embodiment. Although the droplets D1, D2 in the comparative example connect to each other at the stage of FIG. 9, they are prone to separate as time elapses and land on different positions on the recording medium M.

[Terminal Waveform WB]

Figure 10:
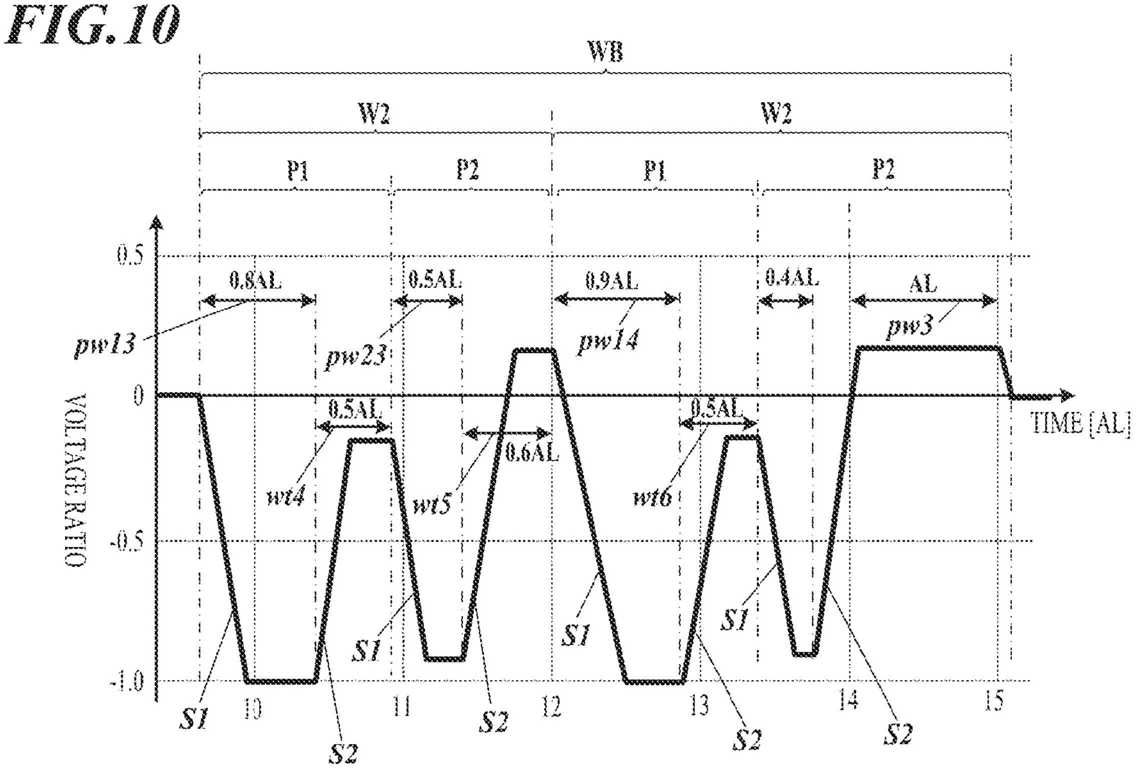
FIG. 10 shows an enlarged terminal waveform.

FIG. 10 shows the enlarged terminal waveform WB.

In the terminal waveform WB, each of the two second unit drive waveforms W2 includes a main pulse P1 and a pullback pulse P2, as with the first unit drive waveform W1. In the second unit drive waveform W2, each of the main pulse P1 and the pullback pulse P2 includes an expansion part S1 and a contraction part S2. The second unit drive waveform W2 causes one ink droplet to jet from the nozzle N by the combination of the main pulse P1 and the pullback pulse P2.

In the second unit drive waveform W2, the pulse width of the main pulse P1 is set within the range of 0.7 AL≤pulse width≤1 AL, or more preferably, 0.7 AL≤pulse width≤0.9 AL, as with in the first unit drive waveform W1. The pulse width of the main pulse P1 in the second unit drive waveform W2 is equal to or greater than the pulse width of the main pulse P1 in the first unit drive waveform W1. In this embodiment, the pulse width pw13 of the main pulse P1 in the second unit drive waveform W2 that comes first is 0.8 AL, and the pulse width pw14 of the main pulse P1 in the second unit drive waveform W2 that comes second is 0.9 AL.

The pulse widths of the main pulses P1 in the respective second unit drive waveforms W2 may be greater than any of the pulse widths of the main pulses P1 in the respective first unit drive waveforms W1.

The pulse width pw23 of the pullback pulse P2 in the second unit drive waveform W2 that comes first is 0.5 AL, and the pulse width pw 24 of the pullback pulse P2 in the second unit drive waveform W2 that comes second is 0.4 AL.

Further, the wait time wt4 between the pulse width pw13 and the pulse width pw23 is 0.5 AL. The wait time wt5 between the pulse width pw23 and the pulse width pw14 is 0.6 AL. The wait time wt6 between the pulse width pw14 and the pulse width pw24 is 0.5 AL. The wait times wt4 to wt6 in the terminal waveform WB are longer than any of the wait times wt1 to wt3 in the repetitive waveform WA.

The voltage amplitude ΔV2 (FIG. 5) of the contraction part S2 of the pullback pulse P2 in the second unit drive waveform W2 is greater than the voltage amplitude ΔV1 of the contraction part S2 of the pullback pulse P2 in the first unit drive waveform W1. More specifically, ΔV1 is 0.73, and ΔV2 is 1.1.

To obtain such a voltage amplitude ΔV2, part of the pullback pulse P2 in the second unit drive waveform W2 is higher than the reference electric potential. Specifically, the contraction part S2 of the pullback pulse P2 changes to be greater than the reference electric potential.

The large voltage amplitude ΔV2 of the contraction part S2 of the pullback pulse P2 contracts the pressure chamber 121, thereby greatly accelerating the ink jetted by the main pulse P1. Thus, the ink droplet jetted by the second unit drive waveform W2 flies faster and can easily catch up with the ink droplet that has been jetted earlier by the first unit drive waveform W1. The speed of the ink droplet jetted by the second unit drive waveform W2 is 7 meters/second, for example.

Figure 11:
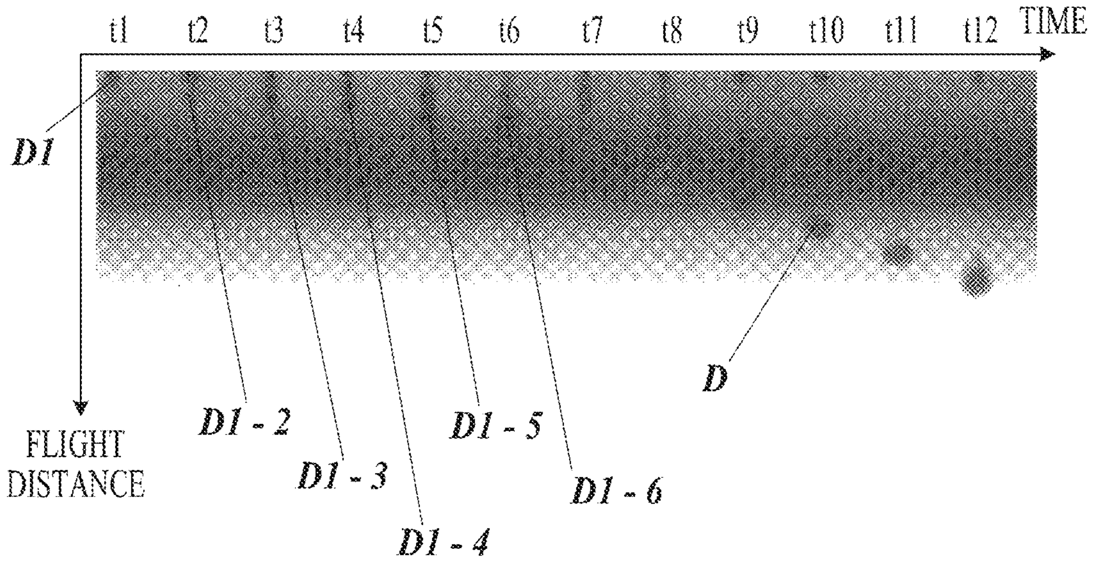
FIG. 11 is a picture of ink droplets jetted by the combined drive waveform.

FIG. 11 is a picture of ink droplets jetted by the combined drive waveform WF.

FIG. 11 shows the ink droplets jetted from one nozzle N by the combined drive waveform WF and continuously imaged. The ink droplets in FIG. 11 are arranged in the time axis.

At time t1, the first ink droplet D1 is jetted by the first unit drive waveform W1 that comes first.

At time t2, the second ink droplet D2 is jetted by the first unit drive waveform W1 that comes second, and the droplets D1 and D2 unite in a pillar shape.

At time t3, the third ink droplet D3 is jetted by the first unit drive waveform W1 that comes third, and the droplets D1 to D3 unite in a pillar shape.

At time t4, the fourth ink droplet D4 is jetted by the first unit drive waveform W1 that comes fourth, and the droplets D1 to D4 unite in a pillar shape.

By the time t4, the ink droplets are jetted at low speed by the first unit drive waveforms W1, so that the united droplets fly at low speed.

At time t5, the fifth ink droplet D5 is jetted by the second unit drive waveform W2 that comes first, and the droplets D1 to D5 unite in a pillar shape.

At time t6, the sixth ink droplet D6 is jetted by the second unit drive waveform W2 that comes last, and the droplets D1 to D6 unite in a pillar shape.

By the time t6, the droplets D5 and D6 jetted at high speed by the second unit drive waveforms W2 catch up with the droplets D1 to D4 and unite as one droplet. At time t7 and thereafter, the large droplet D, into which all the droplets have united, flies at a speed greater than the speeds of the respective droplets by the time t4. At time t9 and thereafter, the large droplet D flies as a substantially spherical droplet as a result that the droplets D5, D6 have caught up from behind at high speed. This restrains such a failure that some of the droplets D1 to D6 land on deviate positions on the recording medium M.

Referring back to FIG. 10, in the second unit drive waveform W2 that comes second in the terminal waveform WB (i.e., the last second unit drive waveform W2 in the combined drive waveform WF), the part higher than the reference electric potential in the pullback pulse P2 has the length of 1 AL. The part is hereinafter called a cancel waveform. The cancel waveform with the length of 1 AL in the pullback pulse P2 can cancel the pressure vibration in the nozzle N that fluctuates on an AL cycle. The pressure vibration in the nozzle N is thus restrained when the next combined drive waveform WF is applied, so that the nozzle N can jet ink droplets with an appropriate amount at an appropriate speed.

[Adjustment of Combined Drive Waveform WF According to Media Gap]

Hereinafter, the method of adjusting the combined drive waveform WF is described. In the method, the combined drive waveform WF is adjusted according to the distance (hereinafter called media gap) between the recording medium M and the openings of the nozzles N of the inkjet heads 10.

The ink with a smaller the size (e.g., diameter) is more likely to decelerate after being jetted from the nozzle N by the effect of air resistance. Therefore, the small ink droplet jetted by the combined drive waveform WF in FIG. 7 is more likely to decelerate while flying than the large ink droplet jetted by the combined drive waveform WF in FIG. 5. The deceleration of the small droplet does not matter when the media gap is small. However, when the media gap is greater and the ink flies for a longer time, the large and small droplets jetted from different nozzles N may land on largely different positions. This causes deterioration of image quality.

To deal with the issue, the method of driving the inkjet head 10 in this embodiment adjusts the combined drive waveform WF on the basis of the greatness of the media gap to align the landing positions of large droplets, medium droplets, and small droplets.

The media gap is greater for a thinner recording medium M, for example. The technique for determining the media gap is not limited to a specific technique. The media gap may be determined on the basis of the kind of the recording medium M obtained from the user's input operation or the print job setting, for example. The media gap may also be determined by directly measuring the height of the surface of the recording medium M on the conveyor belt 2*c*.

Figure 12:
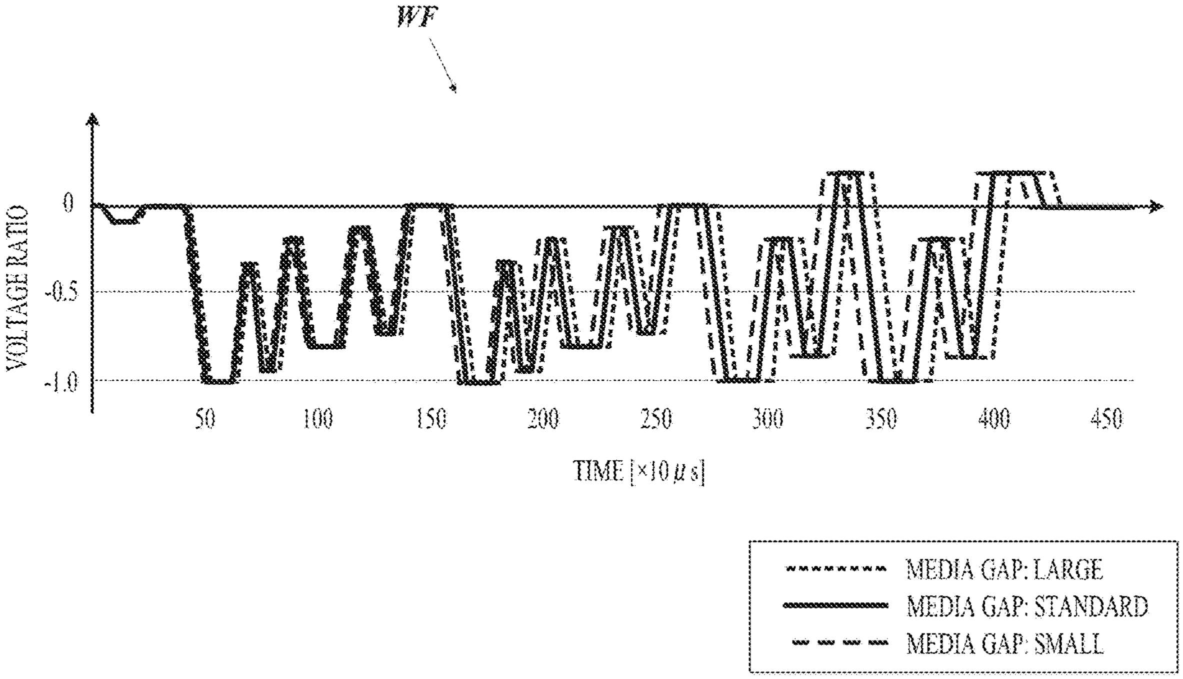
FIG. 12 is a figure to explain how to adjust the combined drive waveform according to a media gap.

FIG. 12 is a figure to explain how to adjust the combined drive waveform WF according to the media gap.

In this adjustment method, the combined drive waveform WF is extended or shrunken in the time direction such that the combined drive waveform WF is longer in the time direction for a greater media gap. That is, the entire combined drive waveform WF is extended or shrunken uniformly so that the length of the combined drive waveform WF becomes the product of the standard length and the extension ratio that corresponds to the greatness of the media gap. The standard length is the length of a normal combined drive waveform WF for a standard media gap.

Figure 13:
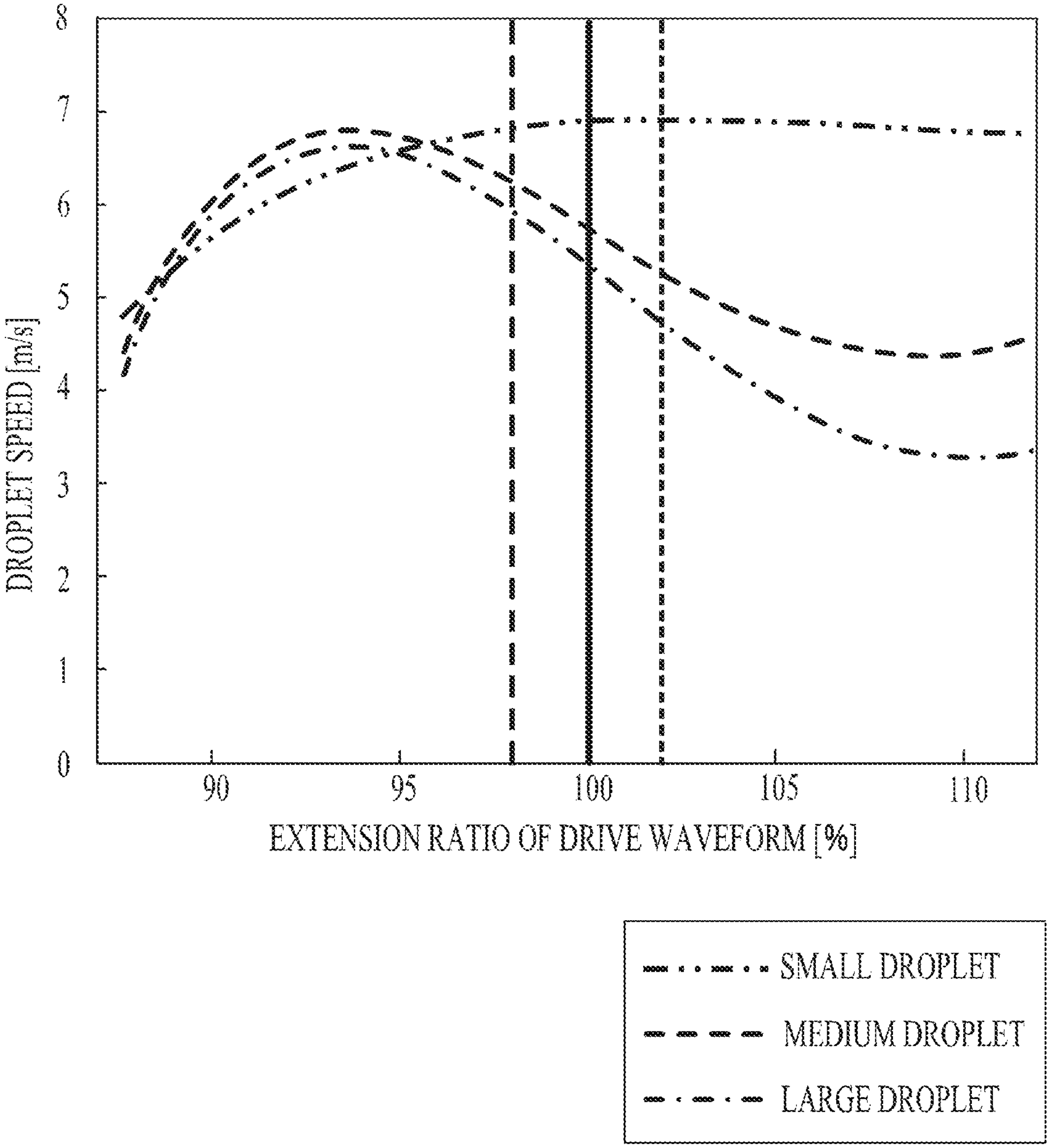
FIG. 13 is a figure showing the speed of ink corresponding to the extension ratio of the combined drive waveform.

FIG. 13 shows the ink speed corresponding to the extension ratio of the combined drive waveform WF.

As shown in FIG. 13, when the extension ratio of the combined drive waveform WF is approximately between 95% and 105% with respect to the standard length (100%), the medium droplet and the large droplet decelerate as the combined drive waveform WF becomes longer. This is because the longer the combined drive waveform WF is, the more greatly the resonance in the pressure chamber 121, which is caused by the repetitive waveform WA, deviates from an optimum resonance condition. Such an effect can be obtained more easily when the repetitive waveform WA is in a shorter range of time than the terminal waveform WB (i.e., the pulse width of the main pulse P1 is shorter and the wait time is shorter), as shown in FIG. 5.

On the other hand, in the above range of the extension ratio, the small droplet flies at almost the same speed.

On the basis of the above, the extension ratio is increased for a greater media gap, so that the speeds of the medium and large droplets are decreased to speeds reflecting the deceleration of the small droplet by air resistance. This allows the small, medium and large droplets to fly at substantially the same speed and restrains decrease of image quality owing to deviated ink landing positions.

The extension ratio of the combined drive waveform WF may be adjusted not only when the media gap is changed but also when the viscosity of ink to be jetted from the nozzles N is changed. Low ink viscosity leads to increase of the residual vibration in the pressure chamber 121, and eventually leads to increase of droplet jetting efficiency. Especially, the speed of the medium and large droplets relatively increases with respect to the speed of the small droplet. To deal with this, the resonance condition is adjusted by changing the extension ratio of the combined drive waveform WF so as to restrain the relative increase in speed of the medium and large droplets and align landing positions of the droplets. Specifically, as the ink viscosity decreases, the extension ratio is increased so that the combined drive waveform WF becomes longer in the time direction. Accordingly, the speeds of the medium and large droplets are reduced and the landing positions are aligned.

As the ink viscosity depends on the ink temperature, the extension ratio of the combined drive waveform WF may be adjusted according to the ink temperature. If ink is heated in the head unit 3, the ink temperature may be detected in the head unit 3. If ink is ejected without being heated, the ink temperature may be the ambient temperature of the inkjet recording apparatus 1.

[Modifications]

Next, modifications of the above embodiment are described.

In the above embodiment, the repetitive waveform WA consists of two first unit drive waveforms W1, and the repetitive waveform WA is repeated on a 4 AL cycle. However, the repetitive waveform WA may include one first unit drive waveform W1. That is, every first unit drive waveform W1 may have the same length and may be repeated as the repetitive waveform WA. In the case, the most preferable length of the repetitive waveform WA (first unit drive waveform W1) is 2 AL. With this feature, the pressure wave in the nozzle at the end of the former repetitive waveform WA accelerates the ink to be jetted by the latter repetitive waveform WA. This can prevent such a failure that the ink droplet jetted by the latter repetitive waveform WA is too slow to unite.

As described above, the inkjet head driving method according to this embodiment is for driving the inkjet head 10 that includes: the nozzle(s) N that jets ink; and the piezoelectric element 160 that changes a pressure on ink in the pressure chamber 121 communicating with the nozzle N in response to receiving a voltage signal having a predetermined unit drive waveform Wn and thereby causes the nozzle N to jet an ink droplet. The method includes applying a voltage signal having a combined drive waveform WF to the piezoelectric element 160 such that ink droplets jetted from the nozzle N unite and land on the recording medium M as one droplet according to the voltage signal having the combine drive waveform WF, the combined drive waveform WF including multiple unit drive waveforms Wn. The unit drive waveforms Wn each include a main pulse P1 as a first pulse waveform that causes the nozzle N to jet an ink droplet and a pullback pulse P2 as a second pulse waveform that pulls back the ink droplet jetted by the main pulse P1 in a direction opposite the ink jetting direction. The main pulse P1 and the pullback pulse P2 each include an expansion part S1 that expands the pressure chamber 121 and a contraction part S2 that is applied after the expansion part S1 and that contracts the pressure chamber 121. The combined drive waveform WF includes a first unit drive waveform W1 and a second unit drive waveform W2 that is applied after the first unit drive waveform W1. The voltage amplitude of the contraction part S2 of the pullback pulse P2 in the second unit drive waveform W2 is greater than the voltage amplitude of the contraction part S2 of the pullback pulse P2 in the first unit drive waveform W1.

According to the driving method, the expansion part S1 of the pullback pulse P2 in the first unit drive waveform W1 is applied at the timing the main pulse P1 causes the nozzle N to jet ink, so that the pressure chamber 121 expands and applies power to the jetted ink droplet in the direction of pulling pack the droplet. Thus, the first unit drive waveform W1 can jet the ink droplet at low speed, so that the droplet easily unites with the ink droplet to be jetted next.

Further, as the ink droplet is pulled back by the pullback pulse P2 of the first unit drive waveform W1, the meniscus that has withdrawn into the nozzle N by the main pulse P1 moves forward toward the opening of the nozzle N. The forward movement of the meniscus increases the amount of the ink droplet to be jetted by the next unit drive waveform Wn, so that the speed of the next droplet is reduced. Further, as the meniscus moves forward and comes closer to its normal position, ink droplets are jetted with a desired amount and at a desired speed at high frequency.

According to the above-described characteristics, the first unit drive waveform W1 enables low-speed ink jetting, so that the ink droplets can unite more easily (typically, the ink droplets already unite at the time of jetting).

Further, the voltage amplitude ΔV2 of the contraction part S2 of the pullback pulse P2 in the second unit drive waveform W2 is greater than the voltage amplitude ΔV1 of the contraction part S2 of the pullback pulse P2 in the first unit drive waveform W1. As the speed of the ink droplet jetted by the second unit drive waveform W2 is relatively increased, the droplet jetted by the second unit drive waveform W2 is more likely to catch up with the ink droplet jetted earlier by the first unit drive waveform W1. Accordingly, the droplets can easily unite as one droplet. Further, the momentum of the ink that has caught up can accelerate the uniting one droplet to an appropriate speed.

As described above, according to the driving method in this embodiment, the first unit drive waveform W1 and the second unit drive waveform W2 jet ink droplets such that the droplets unite as one droplet and fly at an appropriate speed. The method can restrain such a failure that some droplets separate and land on different positions on the recording medium M. Thus, the method can efficiently restrain decrease of image quality.

Further, the last unit drive waveform Wn in the combined drive waveform WF may be the second unit drive waveform W2. According to such a feature, the last droplet is jetted at high speed to make sure that multiple ink droplets unite as one droplet.

Further, the electric potential of the first unit drive waveform W1 may vary within a range not exceeding a predetermined reference electric potential, and the pullback pulse P2 of the second unit drive waveform W2 may have a part that is higher than the reference electric potential. The first unit drive waveform W1, which is equal to or lower than the reference electric potential, restrains acceleration of ink caused by the contraction of the pressure chamber 121 corresponding to the contraction part S2 of the pullback pulse P2 in the first unit drive waveform W1. Accordingly, the speed of the ink droplet jetted by the first unit drive waveform W1 can be considerably reduced.

Further, the second unit drive waveform W2, which is increased to be higher than the reference electric potential in the contraction part S2 of the pullback pulse P2, can greatly accelerate the ink by the contraction of the pressure chamber 121 corresponding to the contraction part S2. Accordingly, the speed of the ink droplet jetted by the second unit drive waveform W2 can be increased, so that the ink droplet can easily catch up with the ink droplet having been jetted earlier by the first unit drive waveform W1.

Further, the last unit drive waveform Wn in the combined drive waveform WF may be the second unit drive waveform W2, wherein the AL is half an acoustic resonance cycle of a pressure wave in the pressure chamber 121, wherein the pullback pulse P2 of the last second unit drive waveform W2 in the combined drive waveform WF has the part that is higher than the reference electric potential and a length of which is 1 AL. According to such a feature, the pressure vibration in the nozzle N vibrating on an AL cycle can be canceled. Accordingly, the pressure vibration in the nozzle N is restrained when the next combined drive waveform WF is applied, so that an ink droplet can be jetted with an appropriate amount at an appropriate speed.

Further, the combined drive waveform WF may include multiple repetitive waveforms WA each of which includes the first unit drive waveform W1 of a predetermined number, wherein each of the repetitive waveforms WF ends at the reference electric potential. As the electric potential returns to the reference electric potential at the end of the repetitive waveform WA, two or more identical repetitive waveforms WA can be applied repeatedly.

Further, each of the repetitive waveforms WA may include two first unit drive waveforms W1, wherein the length of each of the repetitive waveforms WA is equal to or greater than 3.5 AL and less than 4.5 AL. According to such a feature, the pressure wave in the nozzle N at the end of the former repetitive waveform WA accelerates the ink jetted by the latter repetitive waveform WA. This can restrain such a failure that the ink droplet jetted by the latter repetitive waveform WA is too low and cannot unite.

Further, the length of each of the repetitive waveforms may be 4 AL. Such a feature can more securely restrain a failure that the ink droplet jetted by the latter repetitive waveform WA is too slow to unite.

Further, according to the modification, each of the repetitive waveforms WA may include a single first unit drive waveform W1, wherein the length of the first unit drive waveform W1 is 2 AL. This feature can restrain such a failure that the ink droplet jetted by the latter repetitive waveform WA is too slow to unite. The number of repetitive waveforms WA can be easily changed on the basis of the first unit drive waveform W1 as a unit. Thus, the amount of ink jetted by the combined drive waveform WF can be more finely adjusted.

Further, the combined drive waveform WF may be extended or shrunken in a time direction according to the distance between the opening of the nozzle N and the recording medium M such that the greater the distance is, the longer the combined drive waveform WF is in the time direction. The combined drive waveform WF is thus easily adjusted by extending and shrinking. When the media gap is large, the speed of the medium and large droplets can be reduced to a speed reflecting the deceleration of the small droplet, which is caused by air resistance. Accordingly, small, medium and large droplets can fly at a substantially uniform speed. This restrains decrease of image quality owing to deviation of ink landing positions.

Further, the combined drive waveform WF may be extended or shrunken in a time direction according to a viscosity of the ink jetted from the nozzle N such that the lower the viscosity is, the longer the combined drive waveform WF is in the time direction. According to such a feature, the relative increase in the speed of the medium and large droplets is restrained when the ink viscosity is low. Accordingly, small, medium and large droplets can fly at a substantially uniform speed. This restrains decrease of image quality owing to deviation of ink landing positions.

Further, the pulse width of the main pulse P1 in the second unit drive waveform W2 may be equal to or greater than the pulse width of the main pulse P1 in the first unit drive waveform W1. According to such a feature, when the combined drive waveform WF is extended or shrunken at the expansion ratio corresponding to the media gap, the medium and large droplets can be decelerated effectively while the speed variations of the small droplet are restrained.

Further, the pulse width of the main pulse P1 may be equal to or greater than 0.7 AL and equal to or less than 1 AL. Such a feature allows the minimum necessary length of the main pulse P1 for reducing the driving time, while keeping the drive efficiency (droplet amount that can be jetted per voltage amplitude) and allowing ink droplets to unite certainly and effectively at a high frequency driving. Accordingly, decrease of image quality can be restrained.

Further, the pulse width of the main pulse P1 may be equal to or greater than 0.7 AL and equal to or less than 0.9 AL. According to such a feature, the driving time can be further shortened.

Further, the pulse width of each of the pullback pulses P2 may be equal or greater than 0.3 AL and equal to or less than 0.6 AL, and may be shorter than the pulse width of the main pulse P1 in the first unit drive waveform W1 including the pullback pulse P2. Such a feature restrains the pullback pulse P2 from forming a droplet and allows the pullback pulse P2 to pull back the droplet effectively, so that the meniscus m appropriately moves forward.

Further, the combined drive waveform WF includes the vibration waveform W0 that vibrates the liquid ink surface in the nozzle N before the initial unit drive waveform Wn is applied. Vibrating the meniscus of the nozzle N restrains changes of ink jetting characteristics due to the dry ink surface (thickened ink).

Further, the inkjet recording apparatus 1 according to this embodiment includes the inkjet head 10 and the head drive controller 20. The inkjet head 10 includes: the nozzle(s) N that jets ink; the piezoelectric element 160 that changes a pressure on ink in the pressure chamber 121 communicating with the nozzle N in response to receiving a voltage signal having a predetermined unit drive waveform and thereby causes the nozzle N to jet an ink droplet. The head drive controller 20 controls the voltage signals applied to the piezoelectric element 160. The head drive controller 20 applies a voltage signal having a combined drive waveform WF to the piezoelectric element 160 such that ink droplets jetted from the nozzle N unite and land on the recording medium M as one droplet, the combined drive waveform WF including multiple unit drive waveforms Wn. The unit drive waveform Wn includes a main pulse P1 as a first pulse waveform that causes the nozzle N to jet an ink droplet and a pullback pulse P2 as a second pulse waveform that pulls back the ink droplet jetted by the main pulse P1 in a direction opposite the ink jetting direction. The main pulse P1 and the pullback pulse P2 each include: an expansion part S1 that expands the pressure chamber 121; and a contraction part S2 that is applied after the expansion part S1 and that contracts the pressure chamber 121. The combined drive waveform WF includes a first unit drive waveform W1 and a second unit drive waveform W2 that is applied after the first unit drive waveform W1. The voltage amplitude of the contraction part S2 of the pullback pulse P2 in the second unit drive waveform W2 is greater than the voltage amplitude of the contraction part S2 of the pullback pulse P2 in the first unit drive waveform W1. According to such a feature, the first unit drive waveform W1 allows low-speed ink jetting so that the ink can unite more easily in flying (typically, the ink droplets have already united when being jetted). Further, the second unit drive waveform W2 causes the ink droplet to be jetted at relatively high-speed so that the ink droplet can catch up with the ink droplet having been jetted earlier. The ink droplets can accelerate to an appropriate speed while uniting as one droplet. This restrains such a failure that some droplets separate and land on different positions on the recording medium M, so that decrease of image quality is effectively restrained.

The present invention is not limited to the above embodiments and can be variously modified.

For example, the number of repetitive waveforms WA is not limited to two. There may be one, three, or more than three repetitive waveforms WA depending on the number of ink droplets to be jetted and united as one droplet.

Further, the repetitive waveforms WA, which are applied in series, may not exactly be the same but may be slightly different from each other.

Further, the number of first unit drive waveforms W1 included in the repetitive waveform WA is not limited to two (above embodiment) or one (above modification). There may be three or more first unit drive waveforms W1. In the case, the preferable length of the repetitive waveform WA is the number of first unit drive waveforms W1 multiplied by 2 AL.

Further, the number of W2 included in the terminal waveform WB is not limited to two but may be one, three, or more than three.

Further, the combined drive waveform WF may include a waveform for another purpose after the terminal waveform WB.

In the above example, the last second unit drive waveform W2 includes a cancel waveform with the length of 1 AL. However, the example does not limit the present invention. The part of the last second unit drive waveform W2 higher than the reference electric potential may have a length different from 1 AL.

The above embodiment exemplifies the second unit drive waveform W2 part of which is equal to or higher than the reference electric potential. However, the embodiment does not limit the present invention. For example, the waveform may be adjusted such that: both the first unit drive waveform W1 and the second unit drive waveform W2 are equal to or lower than the reference electric potential; and the voltage amplitude ΔV2 of the contraction part S2 of the pullback pulse P2 in the second unit drive waveform W2 is greater than the voltage amplitude ΔV1 of the contraction part S2 of the pullback pulse P2 in the first unit drive waveform W1.

The above embodiment uses the bent-mode inkjet head 10, which jets ink by deforming the piezoelectric element 160 and changing the pressure on the ink in the pressure chamber 121, as an example. However, the embodiment does not limit the present invention. For example, the present invention may be applied to a shear-mode inkjet head. The shear-mode inkjet head includes a pressure chamber in a piezoelectric body and applies a shear-mode displacement on the piezoelectric body constituting the wall of the pressure chamber, thereby changing the pressure on the ink in the pressure chamber.

The above embodiment uses the conveyor belt 2*c* to convey the recording medium M as an example. Instead of the conveyor belt 2*c*, a rotatable conveyor drum may convey the recording medium M on the external circumferential surface thereof, for example.

The above embodiment uses the single-pass inkjet head recording apparatus 1 that uses the single-pass method. However, the present invention may be applied to an inkjet recording apparatus that reciprocates the inkjet head 10 to record images.

Although the embodiments of the present invention has been described, the scope of the present invention is not limited to the above-described embodiments but encompasses the scope of the invention recited in the claims and the equivalent thereof.

INDUSTRIAL APPLICABILITY

The present invention is applicable to an inkjet head driving method and an inkjet recording apparatus.

REFERENCE SIGNS LIST

1 Inkjet recording apparatus
2 Conveyor
2*a*, 2*b* Conveyor rollers
2*c* Conveyor belt
3 Head unit
10 Inkjet head
11 Head chip
12 Jet selection switching element
110 Nozzle substrate
120 Pressure chamber substrate
121 Pressure chamber
130 Oscillation plate
140 Spacer substrate
150 wiring substrate
160 piezoelectric element
20 Head drive controller (drive controller)
21 Head controller
211 CPU
212 Storage
212*a* Waveform pattern data
22 DAC
23 Drive waveform amplifier circuit

30 Main body controller
31 CPU
32 RAM
33 Storage
41 Conveyance controller
42 Communication unit
43 Operation display
44 Bus
D United droplet
M Recording medium
N Nozzle
P1 Main pulse (first pulse waveform)
P2 Pullback pulse (second pulse waveform)
S1 Expansion part
S2 Contraction part
D1 to D6 Droplets
W0 Vibration waveform
W1 First unit drive waveform
W2 Second unit drive waveform
WA Repetitive waveform
WB Terminal waveform
WF Combined drive waveform
Wn Unit drive waveform
m Meniscus

What is claimed is:

1. An inkjet head driving method for an inkjet head, wherein the inkjet head includes a nozzle that jets ink and a pressure generator that changes a pressure on ink in a pressure chamber communicating with the nozzle in response to receiving a voltage signal having a predetermined unit drive waveform and thereby causes the nozzle to jet an ink droplet, wherein the method comprises applying a voltage signal having a combined drive waveform, the combined drive waveform including multiple unit drive waveforms each of which is the unit drive waveform, to the pressure generator and causing the nozzle to jet multiple ink droplets according to the voltage signal having the combined drive waveform such that the ink droplets unite and land on a recording medium as one droplet, wherein the unit drive waveform includes a first pulse waveform that causes the nozzle to jet an ink droplet and a second pulse waveform that pulls back the ink droplet jetted by the first pulse waveform in a direction opposite an ink jetting direction, wherein the first pulse waveform and the second pulse waveform each include an expansion part that expands the pressure chamber and a contraction part that is applied after the expansion part and that contracts the pressure chamber, wherein the combined drive waveform includes a first unit drive waveform being the unit drive waveform and a second unit drive waveform being the unit drive waveform applied after the first unit drive waveform, wherein a voltage amplitude of the contraction part of the second pulse waveform in the second unit drive waveform is greater than a voltage amplitude of the contraction part of the second pulse waveform in the first unit drive waveform, wherein an electric potential of the first unit drive waveform varies with a range not exceeding a predetermined reference electric potential, wherein the second pulse waveform of the second unit drive waveform has a part that is higher than the reference electric potential, wherein a last unit drive waveform in the combined drive waveform is the second unit drive waveform, wherein in the last second unit drive waveform in the combined drive waveform, the second pulse waveform has the part that is higher than the reference electric potential, wherein in the last second unit drive waveform in the combined drive waveform, the second pulse waveform has a length of which is 1 acoustic length (AL), and wherein the acoustic length (AL) is half an acoustic resonance cycle of a pressure wave in the pressure chamber.

2. The inkjet head driving method according to claim 1, wherein the combined drive waveform includes a series of repetitive waveforms each of which includes the first unit drive waveform of a predetermined number, wherein each of the repetitive waveforms ends at the reference electric potential.

3. The inkjet head driving method according to claim 2, wherein each of the repetitive waveforms includes two first unit drive waveforms each of which is the first unit drive waveform, wherein a length of each of the repetitive waveforms is equal to or greater than 3.5 AL and less than 4.5 AL.

4. The inkjet head driving method according to claim 3, wherein the length of each of the repetitive waveforms is 4 AL.

5. The inkjet head driving method according to claim 2, wherein each of the repetitive waveforms includes the single first unit drive waveform, wherein a length of the first unit drive waveform is 2 AL.

6. The inkjet head driving method according to any one of claim 1, wherein the combined drive waveform is extended or shrunken in a time direction according to a distance between an opening of the nozzle and the recording medium such that the greater the distance is, the longer the combined drive waveform is in the time direction.

7. The inkjet head driving method according to claim 6, wherein a pulse width of the first pulse waveform in the second unit drive waveform is equal to or greater than a pulse width of the first pulse waveform in the first unit drive waveform.

8. The inkjet head driving method according to any one of claim 1, wherein the combined drive waveform is extended or shrunken in a time direction according to a viscosity of the ink to be jetted from the nozzle such that the lower the viscosity is, the longer the combined drive waveform is in the time direction.

9. The inkjet head driving method according to any one of claim 1, wherein the acoustic length (AL) is ½ of an acoustic resonance cycle of a pressure wave in the pressure chamber, wherein a pulse width of the first pulse waveform is equal to or greater than 0.7 AL and equal to or less than 1 AL.

10. The inkjet head driving method according to claim 9, wherein the pulse width of the first pulse waveforms is equal to or greater than 0.7 AL and equal to or less than 0.9 AL.

11. The inkjet head driving method according to any one of claim 1, wherein in the unit drive waveform, a pulse width of the second pulse waveform is equal or greater than 0.3 AL and equal to or less than 0.6 AL and shorter than a pulse width of the first pulse waveform.

12. The inkjet head driving method according to any one of claim 1, wherein the combined drive waveform includes a vibration waveform before the initial unit drive waveform, wherein the vibration waveform vibrates a liquid ink surface in the nozzle.

13. An inkjet recording apparatus comprising:

an inkjet head that includes a nozzle that jets ink and a pressure generator that changes a pressure on ink in a pressure chamber communicating with the nozzle in response to receiving a voltage signal having a predetermined unit drive waveform and thereby causes the nozzle to jet an ink droplet; and a drive controller that controls voltage signals to be applied to the pressure generator, wherein the drive controller applies a voltage signal having a combined drive waveform, the combined drive waveform including multiple unit drive waveforms each of which is the unit drive waveform, to the pressure generator and causes the nozzle to jet multiple ink droplets according to the voltage signal having the combined drive waveform such that the ink droplets unite and land on a recording medium as one droplet, wherein the unit drive waveform includes a first pulse waveform that causes the nozzle to jet an ink droplet and a second pulse waveform that pulls back the ink droplet jetted by the first pulse waveform in a direction opposite an ink jetting direction, wherein the first pulse waveform and the second pulse waveform each include an expansion part that expands the pressure chamber and a contraction part that is applied after the expansion part and that contracts the pressure chamber, wherein the combined drive waveform includes a first unit drive waveform being the unit drive waveform and a second unit drive waveform being the unit drive waveform applied after the first unit drive waveform, wherein a voltage amplitude of the contraction part of the second pulse waveform in the second unit drive waveform is greater than a voltage amplitude of the contraction part of the second pulse waveform in the first unit drive waveform, wherein an electric potential of the first unit drive waveform varies with a range not exceeding a predetermined reference electric potential, wherein the second pulse waveform of the second unit drive waveform has a part that is higher than the reference electric potential, wherein a last unit drive waveform in the combined drive waveform is the second unit drive waveform, wherein in the last second unit drive waveform in the combined drive waveform, the second pulse waveform has the part that is higher than the reference electric potential, wherein in the last second unit drive waveform in the combined drive waveform, the second pulse waveform has a length of which is 1 acoustic length (AL), and wherein the acoustic length (AL) is half an acoustic resonance cycle of a pressure wave in the pressure chamber.

* * * * *